United States Patent
Carpino, II et al.

(10) Patent No.: US 7,211,772 B2
(45) Date of Patent: May 1, 2007

(54) PATTERNED ELECTRICAL FOIL HEATER ELEMENT HAVING REGIONS WITH DIFFERENT RIBBON WIDTHS

(75) Inventors: Richard J. Carpino, II, Magnolia, OH (US); James A. Mullen, Copley, OH (US)

(73) Assignee: Goodrich Corporation, Charlotte, NC (US)

( * ) Notice: Subject to any disclaimer, the term of this patent is extended or adjusted under 35 U.S.C. 154(b) by 0 days.

(21) Appl. No.: 11/331,003

(22) Filed: Jan. 13, 2006

(65) Prior Publication Data

US 2006/0201933 A1    Sep. 14, 2006

Related U.S. Application Data

(63) Continuation-in-part of application No. 11/078,707, filed on Mar. 14, 2005.

(51) Int. Cl.
*H05B 3/54* (2006.01)

(52) U.S. Cl. .................. 219/528; 219/385; 219/532; 219/548; 219/553

(58) Field of Classification Search ............ 219/528, 219/532, 385, 548, 553; 29/611
See application file for complete search history.

(56) References Cited

U.S. PATENT DOCUMENTS

| | | | | |
|---|---|---|---|---|
| 3,495,328 A | * | 2/1970 | Ziver ........................ | 29/611 |
| 3,573,430 A | * | 4/1971 | Eisler ....................... | 219/385 |
| 3,798,417 A | * | 3/1974 | Bittner ...................... | 219/532 |
| 4,036,457 A | | 7/1977 | Volkner et al. | |
| 4,518,851 A | | 5/1985 | Oppitz | |
| 4,533,821 A | | 8/1985 | Sato | |
| 4,574,186 A | * | 3/1986 | Sakai et al. ............... | 219/528 |
| 4,581,522 A | | 4/1986 | Graham | |
| 4,797,537 A | * | 1/1989 | Berthelius et al. ......... | 219/528 |
| 4,826,108 A | | 5/1989 | Briscoe et al. | |
| 5,098,037 A | | 3/1992 | Leffel et al. | |
| 5,248,116 A | | 9/1993 | Rauckhorst | |
| 5,361,183 A | | 11/1994 | Wiese | |
| 5,380,988 A | * | 1/1995 | Dyer ........................ | 219/548 |
| 5,427,332 A | | 6/1995 | Rauckhorst, III et al. | |
| 5,453,597 A | | 9/1995 | McWilliams | |
| 5,475,204 A | | 12/1995 | Giamati et al. | |
| 5,590,854 A | | 1/1997 | Shatz | |
| 5,641,421 A | * | 6/1997 | Manov et al. ............. | 219/553 |
| 5,657,951 A | | 8/1997 | Giamati | |
| 5,928,549 A | * | 7/1999 | Hitzigrath ................. | 219/548 |
| 6,027,075 A | | 2/2000 | Petrenko | |
| 6,046,435 A | * | 4/2000 | Holden et al. ............ | 219/390 |
| 6,202,304 B1 | | 3/2001 | Shatz | |
| 6,237,874 B1 | | 5/2001 | Rutherford et al. | |
| 6,279,856 B1 | | 8/2001 | Rutherford et al. | |
| 6,330,986 B1 | | 12/2001 | Rutherford et al. | |
| 6,832,742 B2 | | 12/2004 | Petrenko et al. | |

* cited by examiner

*Primary Examiner*—Robin Evans
*Assistant Examiner*—Leonid M. Fastovsky
(74) *Attorney, Agent, or Firm*—Womble Carlyle

(57) ABSTRACT

A patterned foil sheet heating element has a first discrete region patterned with a first plurality of holes forming multiple conductive ribbons and having a first sheet resistivity. It also has a second discrete region patterned with a second plurality of holes forming multiple conductive ribbons and having a second sheet resistivity. At least some of the multiple conductive ribbons in the first discrete region are in electrical continuity with at least some of the multiple conductive ribbons in the second discrete region, and the first discrete region and the second discrete region both adjoin a first junction strip of the foil heating element. An electrothermal heating assembly may be formed using such a patterned foil sheet sandwiched between two layers of material which may be thermally conductive and electrical insulative.

20 Claims, 7 Drawing Sheets

100

200

PATTERNED ELECTRICAL FOIL HEATER ELEMENT HAVING REGIONS WITH DIFFERENT RIBBON WIDTHS

CROSS REFERENCE TO RELATED APPLICATIONS

This application is a Continuation-in-part of U.S. patent application Ser. No. 11/078,707, filed Mar. 14, 2005, whose contents are incorporated by reference in their entirety.

BACKGROUND OF THE INVENTION

Heaters are used in many applications where heat is required to help warm an adjacent area. Electrothermal heating is a common way to warm surfaces and spaces on an aircraft by providing heaters bonded to or integrated within the structure. It may also be used in internal areas of an aircraft, examples in areas such as the cockpit cabin or floors for warming, pipes that may contain liquids that could freeze, and even for volumetric heating of a passenger or air cargo compartment. In electrothermal heating systems, heat energy is typically applied through a metallic heating element via electrical power supplied by aircraft or appropriate application generators. Typical heating elements are made from foil, wire and metallic-coated fabrics.

Generally, the heating element of an electrothermal heater should be highly flexible to conform to many types of surface areas and shapes to be protected. Such surface areas may be either two- or three-dimensional. In addition, such heating elements should also withstand fatigue and foreign object damage (FOD) requirements for each particular application. Further, such heating elements should be capable of being specifically designed to provide exact power levels (heat) and uniform heat distribution to the warmed surfaces or regions.

Most current heater elements are made from a single channel foil or wire element assembly 100, 200, respectively, as exemplified by the illustrations of FIGS. 1 and 2, respectively. Accordingly, a failure or break of the single element via FOD/fatigue in most current heater elements can reduce or eliminate the heating element's usefulness. The prior art also includes a movable sheet having a rectangular array of perforations and mounted on rollers, as disclosed in U.S. Pat. No. 5,590,854; a grid-type of electrical heating element that is painted on, as disclosed in U.S. Pat. No. 6,027,075, and a mesh of interwoven wire, as disclosed in U.S. Pat. No. 6,832,742.

SUMMARY OF THE INVENTION

In one aspect, the present invention is directed to a foil heating element. The foil heating element in accordance with the present invention comprises a patterned foil sheet. The patterned foil sheet includes a first discrete region patterned with a first plurality of holes forming multiple conductive ribbons and having a first sheet resistivity, and it also includes a second discrete region patterned with a second plurality of holes forming multiple conductive ribbons and having a second sheet resistivity. At least some of the multiple conductive ribbons in the first discrete region are in electrical continuity with at least some of the multiple conductive ribbons in the second discrete region, and the first discrete region and the second discrete region both adjoin a first junction strip of the foil heating element.

The differences in sheet resistivity may be the result of using different hole sizes, different hole shapes and varying the hole center spacings in each region, or combinations of these, in the patterned foil sheet.

In another aspect, the present invention is directed to an electrothermal heating assembly comprising such a foil heating element sandwiched between first and second layers of material. The electrothermal heating assembly may comprises two or more such heating elements, and these may lie in the same plane. Also, the first and second layers of material may be both thermally conductive and electrically insulative.

BRIEF DESCRIPTION OF THE DRAWINGS

FIG. 3b shows a close-up of the holes seen in FIG. 3a.

DETAILED DESCRIPTION OF THE INVENTION

Figure 3A:
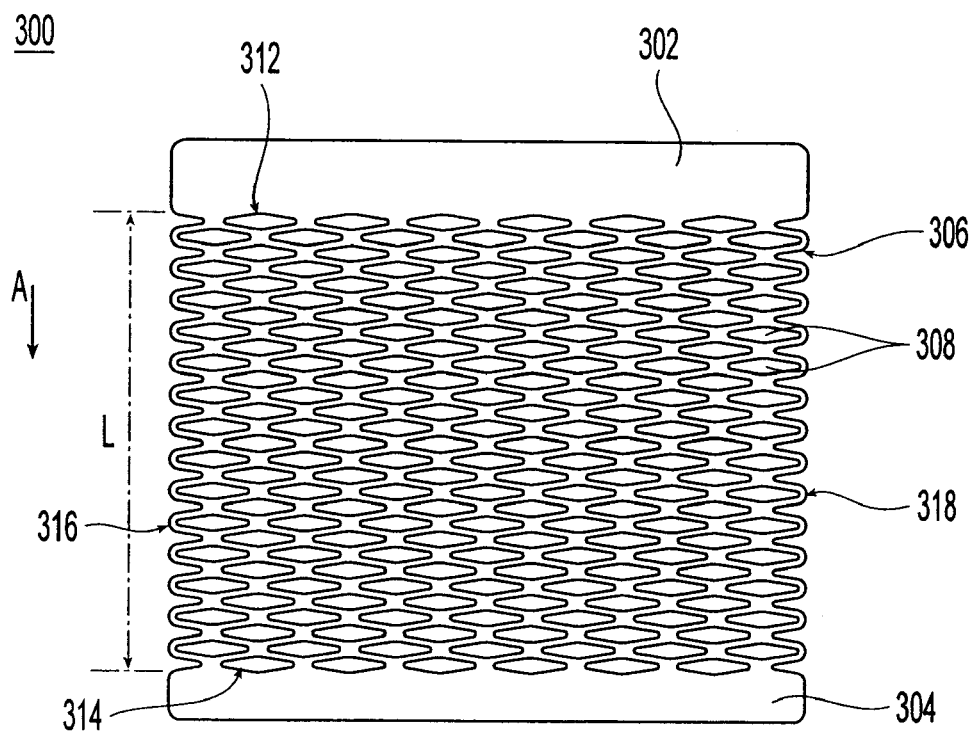
FIG. 3a shows a foil heating element having a pattern of diamond-shaped holes to form multiple electrical paths.

FIG. 3a shows a patterned foil sheet electrical resistance heating element 300 formed from a single sheet of conductive material. Preferably, it is formed from a sheet of an alloy such as CUPRON® or INCONEL®, materials that are familiar to those skilled in the art. Other materials may also be suitable for this purpose. Such materials come in different thicknesses, but a sheet having an initial thickness of about 5 mil may be preferred for this purpose.

The foil sheet is patterned with a plurality of holes. The patterning can be realized in a number of ways, such as perforating, stamping, etching or by employing other techniques to form holes in such a foil sheet.

In one embodiment etching is employed to form the pattern of holes. Typically, the sheet is initially etched using a patterned mask to form a pattern of openings and then a surface etch of the entire surface is performed to uniformly reduce the sheet thickness. During this surface etch, the sheet's resistance is monitored until a desired value is reached. The resulting sheet is then placed in a laminate comprising electrically insulative, but thermally conductive layers. In one embodiment the etched sheets are sandwiched between a layers of KAPTON® polyimide film, preferably between 1–5 mils thick. In another embodiment the layers may be formed of fiberglass. In still other embodiments, epoxy or neoprene/urethane layers may be used. Other techniques and parameters for manufacturing and laminating such a heating element are known to those skilled in the art.

The heating element 300 seen in FIG. 3a comprises a first junction strip 302, a second junction strip 304, and a patterned region 306 in-between. The first and second junction strips 302, 304 may serve as bus connections suitable for electrically connecting to a power supply and/or additional heating elements.

Figure 3B:
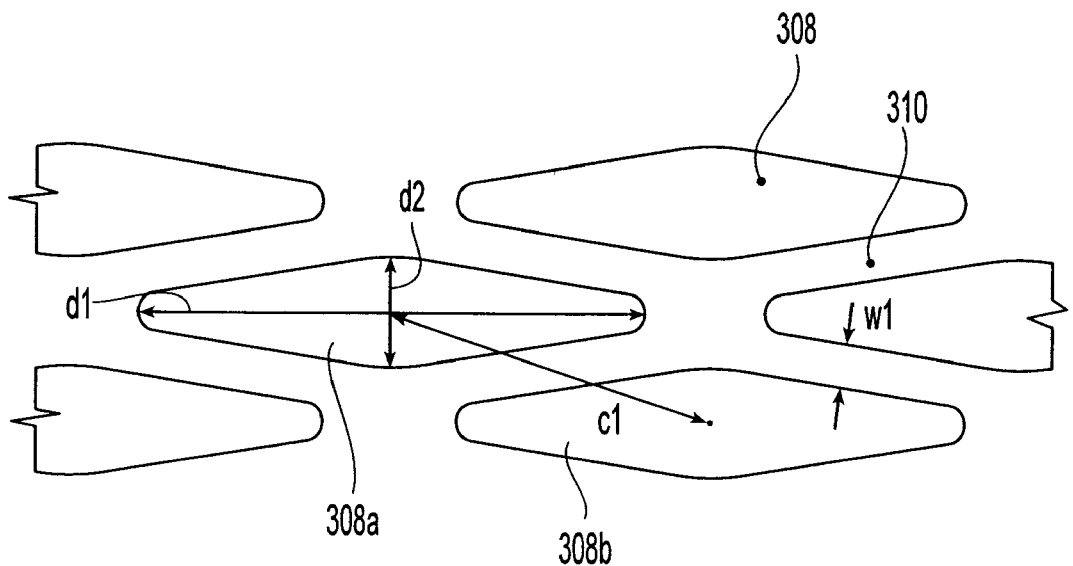

The patterned region 306 comprises a plurality of holes 308 separated by ribbons 310. As best seen in FIG. 3b, the ribbons have a ribbon width w1 in areas between the holes 308. The patterned region 306 thus comprises multiple conductive paths, which improve reliability by ensuring that a single break, or even multiple breaks, in the ribbons will not render the heating element 300 useless.

The patterned region 306 has a length L defined by opposite first and second ends 312, 314, respectively. A first direction, indicated by the arrow A, is defined from the first end 312 to the second end 314. The arrow A depicts the overall direction of current flow in the heating element 300. As seen in FIG. 3, the boundaries defining the ends 312, 314 are perpendicular to the overall direction of current flow A. The patterned region 306 is also bounded by lateral edges 316, 318. As seen in FIG. 3a, the lateral edges 316, 318 are scalloped, as determined by the shape of the holes 308 immediately adjacent these edges.

In the embodiment of FIG. 3a, the first 302 and second 304 junction strips are on opposite ends of the patterned region 306. The first junction strip 302 forms a first contact region that adjoins the first end 310 portion of patterned region 306. The first junction strip 302, which preferably is not patterned, provides the foil sheet 300 with an area to which a first electrical connection may be made. The second junction strip 304 forms a second contact region adjacent the second end portion 312 of patterned region 306. Like the first junction strip, the second junction strip 304 also is not patterned and provides an area to which a second electrical connection is made.

The holes 308 in the first patterned region 104 results in the creation of multiple electrical paths between the first end 312 and the second end 314. Furthermore, the holes 308 are arranged in a direction transverse to the first direction A such that the first patterned region 306 is devoid of a continuous section of foil material between the first end 312 and the second end 314 along a line parallel to said first direction A. In other words, when viewed along the first direction A, there is no straight-line path of foil material in areas away from the lateral edges 316, 318. This is because the holes 308 are configured and dimensioned such that the multiple electrical paths in areas away from lateral edges of said first patterned region are all non-parallel to said first direction—the paths being forced to travel around the holes.

In the embodiment of FIG. 3a, the holes 308 are diamond-shaped and all holes have the same size. In addition, these holes 308 have rounded corners, which help minimize damage due to fatigue. The holes 308 imbue the foil sheet 300 with the above-described characteristics of multiple electrical paths, overlap, and line-of sight properties, among others.

As seen in FIG. 3b, the diamond-shaped holes 308 have a major axis d1 that is perpendicular to direction A and a minor axis d2 that is parallel to direction A. In addition, diagonally adjacent holes 308A, 308B have a constant center spacing c1 in a first direction. In one embodiment, the diamond-shaped holes 308 of FIG. 3a have major axis d1 of about 1.2 cm and a minor axis d2 of about 0.23 cm. Since the center spacing c1 of diagonally adjacent holes are approximately 0.48 cm, the resulting ribbon width w1 is approximately 0.10 cm. It is understood, however, that these dimensions may vary, depending on the required power and 2-D area of the foil sheet 300.

Figure 4:
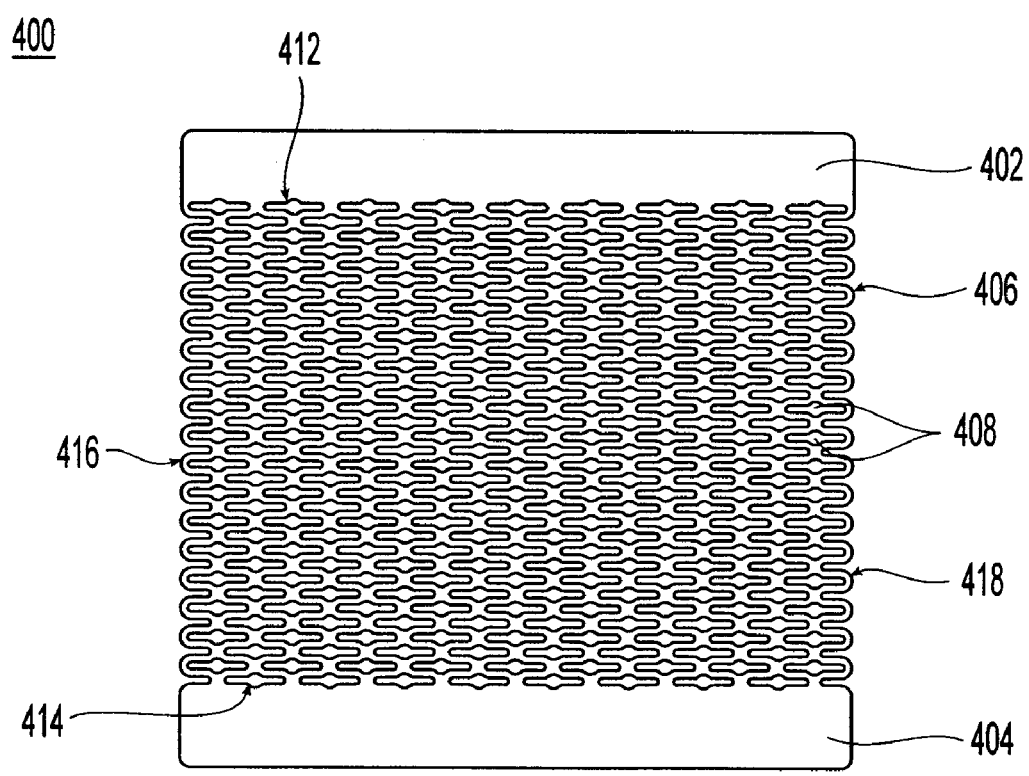
FIG. 4 shows a foil heating element having a pattern of keyhole-shaped holes to form multiple electrical paths.

Turning to FIG. 4, the foil sheet 400 has a first junction strip 402, a second junction strip 404 and a patterned region 406 in-between. The patterned region 406 is bounded by a first end 412, a second end 414, a first lateral edge 416 and a second lateral edge 418. The holes 408 in the patterned region 406 are keyhole-shaped with rounded edges at the ends of the keyhole. A long dimension of the keyhole-shaped holes is oriented transverse to the first direction A representing the overall direction of current flow. The holes 408 imbue the foil sheet 400 with the characteristics discussed above with respect to FIG. 3a regarding the creation of multiple electrical paths, overlap, line-of sight properties, etc., in the direction A. Thus, the primary difference between the embodiments of FIG. 3a and FIG. 4 is the shape of the holes.

Figure 5:
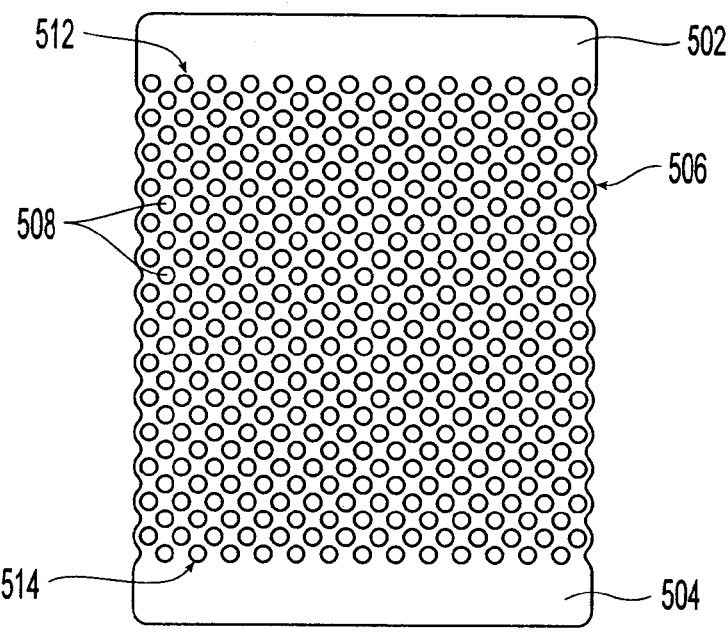
FIG. 5 shows a foil heating element having a pattern of circular holes to form multiple electrical paths.

In FIG. 5, the holes 508 are circular in shape and extend between the junction strips 502, 504 formed at opposite ends 512, 514 of the patterned region 506.

Figure 6:
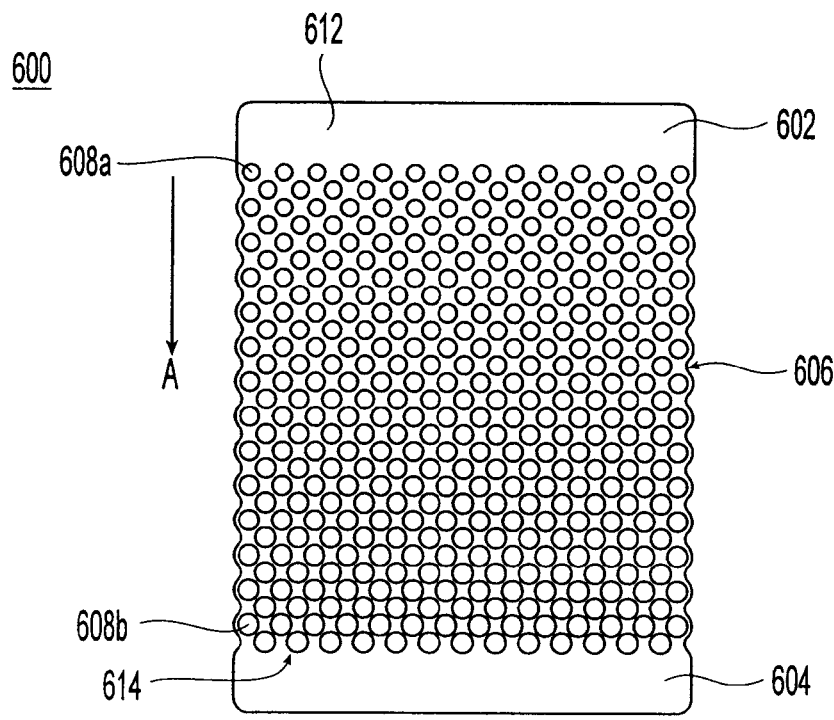
FIG. 6 shows a foil heating element having a pattern of circular holes of varying sizes resulting in varying-width ribbons.

In FIG. 6, the holes 608 again are circular in shape, and extend between the junction strips 602, 604 formed at opposite ends 612, 614 of the patterned region 606. However, in this embodiment, the holes 608 increase in size between the first end 612 and the second end 614 of the pattern region 606. The holes 608A near the first end 612 are seen to be smaller than holes 608B near the second end 614. In particular, the holes are monotonically increasing in size from the first end 612 to the second end 614.

In general, it is understood that varying hole sizes, hole shapes and hole center spacings all influence the sheet resistivity by affecting the ribbon widths (and thus the ribbon cross-sectional area), the path lengths of each ribbon element, and the number of such paths, respectively. Such actions can change the metal volume of a given cross section of the heating element, thereby changing sheet resistivity.

Figure 1:
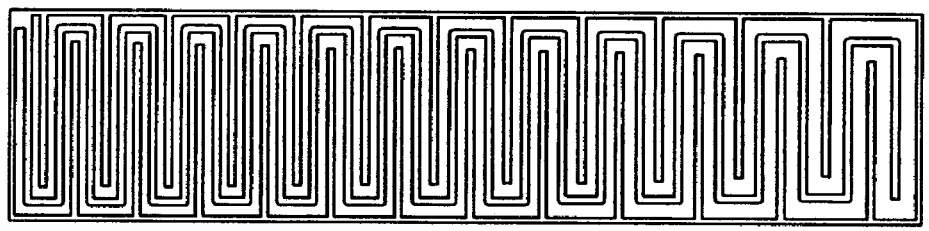
FIG. 1 shows a first type of prior art electrothermal heating element.
Figure 2:
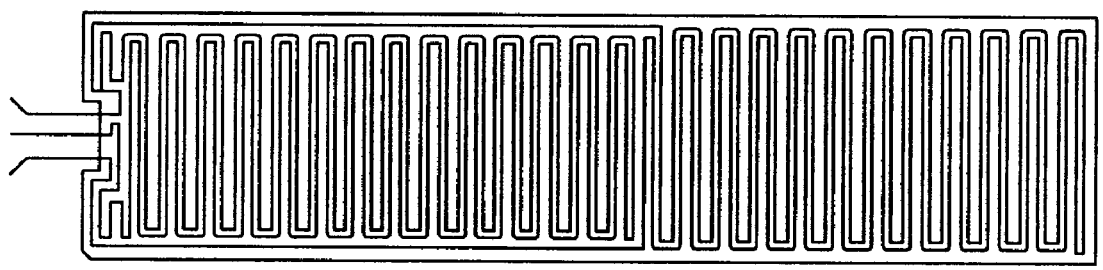
FIG. 2 shows a second type of prior art electrothermal heating element.

The metal/hole patterns of the heating element embodiments described thus far generate a robustness through their redundant circuitry. They have more ribbons (metal channels) than a typical current heaters seen in FIGS. 1 and 2, respectively, which have a single metal channel (foil/wire) that is interconnected in both the x and y direction. In the heating element embodiments described above, a breakage of several arteries by FOD or fatigue, for example, will result in only a minimal degradation to heating element functionality. Furthermore, the metal/hole foil pattern in these embodiments may also be tailored to specific heat densities in local areas by chemically etching the metal ribbon surfaces (element thickness) or edges and/or by changing the size, shape and locations of the holes.

Figure 7:
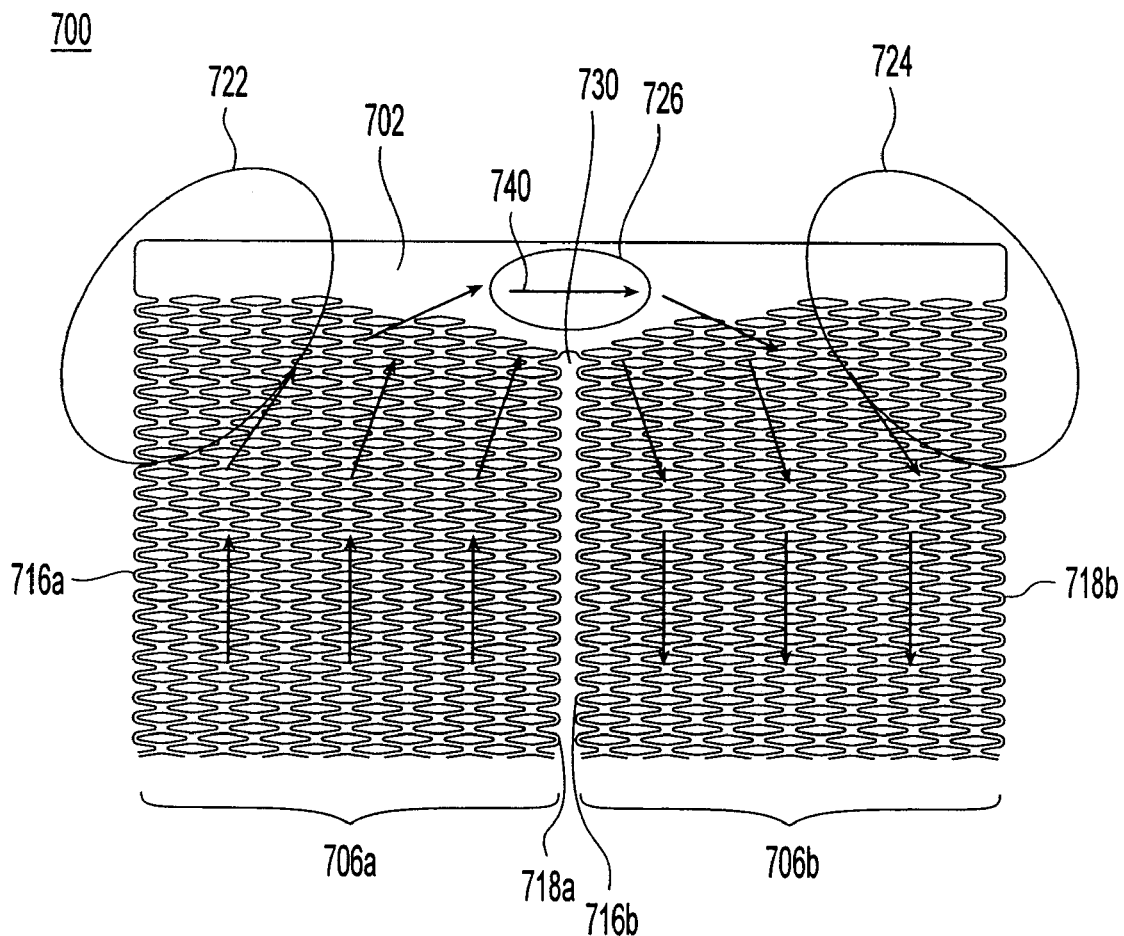
FIG. 7 shows a foil heating element comprising a pair of electrical buses and depicts the current flow between the buses.

FIG. 7 shows a heating element 700 formed from a single sheet of conductive material. The heating element 700 comprises a junction strip 702 that connects a first bus 706A to a second bus 706B, the buses being separated along most of their length by a longitudinally extending gap 730. The first bus 706A includes first and second lateral edges 716A, 718A, respectively while the second bus 706B includes first and second lateral edges 716B, 718B. As seen in FIG. 7, lateral edge 718A is across the gap 730 from lateral edge 716B.

In one embodiment, the junction strip is approximately 12.5 cm wide and has a maximum height of about 1.8 cm at is center, above the gap 730. The buses 706A, 706B are about 6.0 cm wide and the gap 730 has a width of about 0.5 cm. It is understood that these values are only exemplary and that other values for these parameters may be equally suitable.

The lower portions of the buses 706A, 706B are not shown in FIG. 7. However, the buses 706A, 706B of the heating element 700 are connected and operated such that current flows through the left bus 706A towards the junction strip 702, across at least a portion of the junction strip in the region above the gap 730, and then flows away from the junction strip 702 through the right bus 706B. This flow of current is depicted by the arrows 740.

The left bus 706A and the right bus 706B each comprise regions with diamond-shaped holes of the sort seen in the embodiment of FIG. 3a. In one embodiment, the holes are all the same size in both buses 706A, 706B and so these buses have a uniform pattern of holes.

Ideally, during use, the heating element 700 has a certain output power or heating performance requirement. As a consequence, the heating element 700 generally must maintain a uniform target surface temperature within some tolerance. In the general case, this can be given by X±Y, where X is the target surface temperature and Y is a tolerance, both values being given in degrees. As an example, the target surface temperature may be 130° F.±5° F. When the heating element does not meet the target temperature, cold spots may form in first regions 722, 724 while hot spots may form in second regions 726 between the first regions. In the exemplary embodiment of FIG. 7, due to the specific pattern of holes and ribbons, the cold spots are shown to form proximate the corners of the junction strip 702 while hot spots are shown form in regions where the bulk of the current flows through the junction strip 702.

Figure 8:
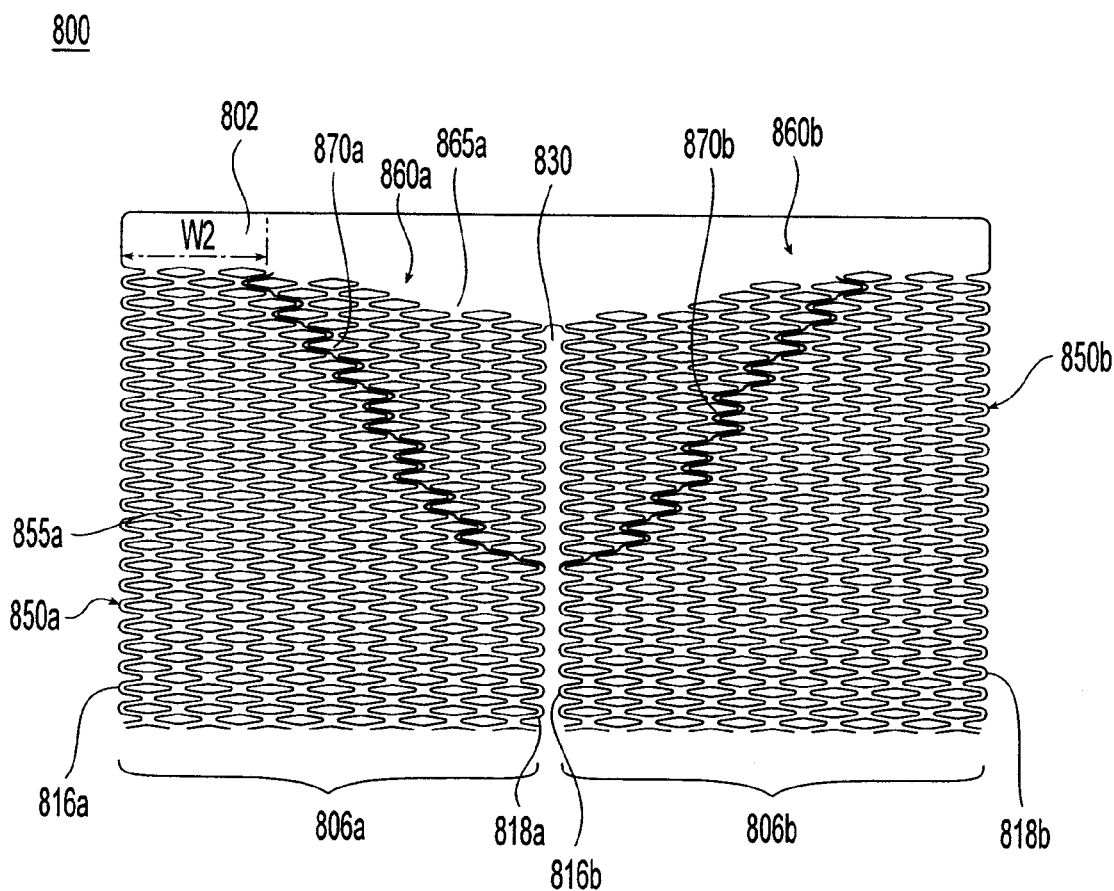
FIG. 8 shows a foil heating element comprising a pair of electrical buses in accordance with the present invention.

FIG. 8 shows an embodiment of a heating element 800 in accordance with the present invention. The heating element 800 comprises a junction strip 802 that connects a first bus 806A to a second bus 806B, the buses being separated along most of their length by a longitudinally extending gap 830. The first bus 806A includes first and second lateral edges 816A, 818A, respectively, while the second bus 806B includes first and second lateral edges 816B, 818B, respectively. As seen in FIG. 8, lateral edge 818A is across the gap 830 from lateral edge 816B.

Importantly, in heating element 800, the first bus 806A comprises two patterned regions marked 850A, 860A. In the embodiment of FIG. 8, the two patterned regions are separated by a boundary 870A. In terms of electrical qualities, the first patterned region 850A has a first sheet resistance and the second patterned region 860A has a second sheet resistance. More particularly, the second patterned region 860A has a higher sheet resistance than the first patterned region 850A. Because of this increased sheet resistance in the second patterned region 860A, the current is forced to take another path, thus mitigating hot spots that otherwise might be present.

This difference in sheet resistances is the result of each patterned region 850A, 860A having a different ribbon-to-gap ratio, which is a ratio of the area of the ribbons that remain to the surface area of the holes formed. In particular, the ribbon-to-gap ratio in the first region 850A is larger than the ribbon-to-gap ratio in the second patterned region 860A. This difference in ribbon-to-gap ratios can be correlated to differences in average ribbon widths between the holes in the two patterned regions. It should be evident to one skilled in the art that a smaller average ribbon width translates into a smaller ribbon cross-sectional area, and thus, larger sheet resistance.

By way of example, in the embodiment of FIG. 8, the ribbon-to-gap ratio in the first patterned region 850A is 0.62 and the ribbon-to-gap ratio in the second patterned region 860A is 0.41. Thus, in the embodiment shown, the ribbon-to-gap ratio of the first patterned region 850A is a factor on the order of 1.5 times as great as the ribbon-to-gap ratio of the second patterned region 860A. Generally speaking, however, this factor (i.e., the ratio of the larger ribbon-to-gap ratio to the smaller ribbon-to-gap ratio) can range from 1.2 to 2.5, depending on the application. It is further understood that the ribbon-to-gap ratios may be tailored to the material used, the shape and size of the junction strip 802, and the shape and size of the bus 806A, among other factors.

In the embodiment exemplified by heating element 800, the centers of all the holes 855A, 865A, regardless of the region 850A, 860A to which they belong, are evenly spaced apart. The difference in ribbon-to-gap ratios results from forming holes 855A of one size in the first region 850A and holes 865A of a second, larger size in the second region 860A. It is understood that differences in sheet resistance in each region can be achieved by one or more of using different hole sizes, different hole shapes and varying the hole center spacings in each region 850A, 860A, and combinations thereof.

In the embodiment of FIG. 8, the second region 860A comprises a wedge-shaped area bounded on a first side by the first lateral edge 881A, on a second side by the junction strip 802 and on a third by the boundary 870A with the first region 850A. The boundary 870A is shown in this embodiment to approximately be a 45° diagonal extending from the junction strip 802 to the first lateral edge 881A. As seen in this embodiment, the boundary 870A is staggered and follows the contours of laterally outwardly facing portions of larger holes 865A that are on the border of the two regions 850A, 860A. It is understood that in some wedge-shaped embodiments, the boundary may be at an angle other than 45°, and in still other embodiments, the second region 860A may take on a shape other than a wedge.

Also, in the embodiment of FIG. 8, the second patterned region 860A does not extend all the way to the first lateral edge 816A. Instead, a predetermined width W2 of the first patterned area 850A extends along the junction strip 802. Thus, the junction strip 802 adjoins a section of first patterned region 850A that extends to the first lateral edge 816A and also adjoins a section of second patterned area 860A that extends to the second lateral edge 818A. Similarly, the gap 830 borders a section of second patterned region 860A that is proximate the junction strip 802 and also borders a section of the first patterned region 850A that is away from the junction strip 802.

The second bus 806B is similar in construction to the first bus 806A, having first lateral edge 816B and second lateral edge 818B. Second bus 806B also comprises first patterned region 850B separated from second patterned region 860B by boundary 870B. In the embodiment of FIG. 8, similar to the first bus 806A, the boundary 870B again results in the wedge-shape second patterned region 860B in the second bus 806B.

The heating element 800 is made by etching a foil sheet of the type described above using a specially designed mask having at least two different regions, each with different hole sizes. People skilled in the art know how to make such masks, once the pattern is understood.

Figure 9:
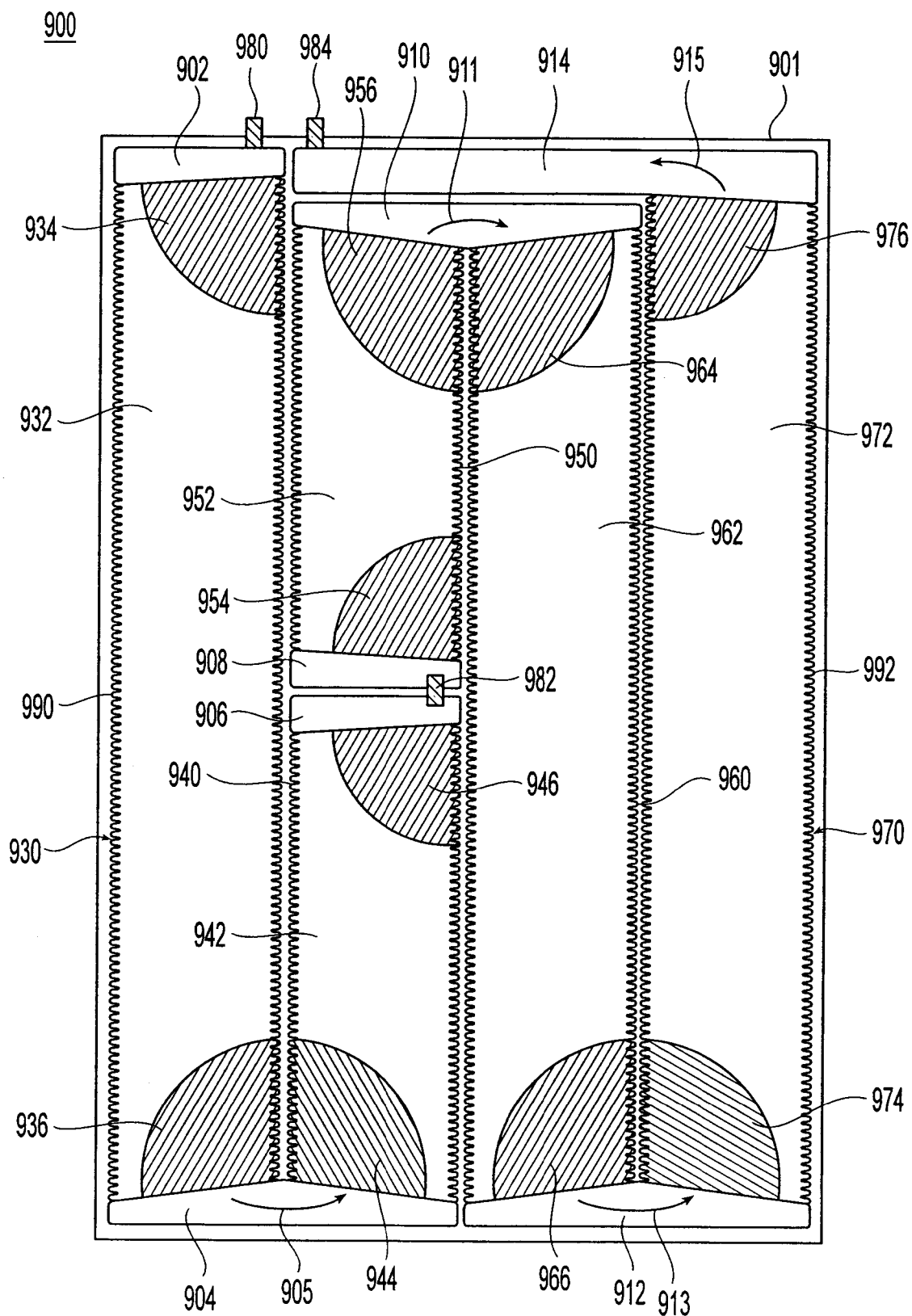
FIG. 9 shows an electrothermal heating assembly that incorporates a foil heating element of the sort seen in FIG. 8.

FIG. 9 shows an electrothermal assembly 900 comprising a plurality of heating elements 990, 992, each heating element comprising one or more junction strips and buses.

As shown here, the heating elements 990, 992 are mounted on a thermal conductive, electrically insulative substrate 901. In one embodiment of an assembly, the heating elements 990, 992 are in the same plane and are sandwiched between two layers of such substrate material, as discussed above.

Heating element 990 comprises first junction strip 902, second junction strip 904, third junction strip 906, first bus 930 and second bus 940. A first electrical contact 980 in communication with the first junction strip 902 provides a first terminal for connecting to a power supply.

The first bus 930 comprises a first patterned region 932 which adjoins both the first junction strip 902 and the second junction strip 904. The first bus 930 also comprises a second patterned region 934 that adjoins the first junction strip 902 and a third patterned region 936 that adjoins the second junction strip 904. As seen in FIG. 9, the wedge-shaped second and third patterned regions 934, 936 are both bordered by the first patterned region 932, the junction strips 902, 904, respectively, and by a common gap separating bus 930 from buses 940 and 950.

The sheet resistivities of the second and third patterned regions 934, 936 both differ from that of the first patterned region 932. However, the sheet resistivities of the second and third patterned regions 934, 936 do not have to be the same—they may differ from each other. It is understood that the difference in sheet resistivities between one patterned region and another is the result of differences in hole sizes, hole shapes and/or hole center spacings, all as discussed above. Furthermore, this holds for all the other buses 940, 950, 960 and 970.

The second bus 940 comprises a first patterned region 942 that adjoins both the second junction strip 904 and the third junction strip 906, a second patterned region 944 that adjoins the second junction strip 904, and a third patterned region 946 that adjoins the third junction strip 906.

It is noted here that the second junction strip 904 provides a region where the current turns, as indicated by arrow 905, from first bus 930 to second bus 940. The patterned regions 936 and 944, both of which adjoin the second junction strip 904, have higher sheet resistivity than the first patterned regions 932, 942, respectively, in their respective buses 930, 940. This helps reduce the formation of hot spots and cold spots in various portions of the second junction strip 904 and also in portions of the buses 930, 940 proximate the second junction strip 904.

The second heating element 992 includes third bus 950, fourth junction strip 908, fifth junction strip 910, fourth bus 960, sixth junction strip 912, fifth bus 970 and seventh junction strip 914.

The third bus 950 comprises a first patterned region 952 that adjoins both the fourth junction strip 908 and the fifth junction strip 910, a second patterned region 954 that adjoins the fourth junction strip 908, and a third patterned region 956 that adjoins the fifth junction strip 910.

The first heating element 990 and the second heating element 992 are electrically connected to one another via a thermal fuse 982, which typically is a fusible conductor bridging third junction strip 906 and fourth junction strip 908. The patterned regions 946 and 954 on either side of the thermal fuse 982 help ensure more uniform current flow in the adjacent junction strips 906, 908 belonging to buses 940, 950, respectively.

The fourth bus 960 comprises a first patterned region 962 that adjoins both the fifth junction strip 910 and the sixth junction strip 912, a second patterned region 964 that adjoins the fifth junction strip 910, and a third patterned region 966 that adjoins the sixth junction strip 912.

The fifth junction strip 910 provides a region where the current turns, as indicated by arrow 911, from third bus 950 to fourth bus 960. The patterned regions 956 and 964, both of which adjoin the fifth junction strip 910, have higher sheet resistivity than the first patterned regions 952, 962, respectively, in their respective buses 950, 960. This helps reduce the formation of hot spots and cold spots in various portions of the fifth junction strip 910 and also in portions of the buses 950, 960 that are close to the fifth junction strip 910.

The fifth bus 970 comprises a first patterned region 972 that adjoins both the sixth junction strip 912 and the seventh junction strip 914, a second patterned region 974 that adjoins the sixth junction strip 912, and a third patterned region 976 that adjoins the seventh junction strip 914.

The sixth junction strip 912 provides a region where the current turns, as indicated by arrow 913, from fourth bus 960 to fifth bus 970. The patterned regions 966 and 974, both of which adjoin the sixth junction strip 912, have higher sheet resistivity than the first patterned regions 962, 972, respectively, in their respective buses 960, 970. This helps reduce the formation of hot spots and cold spots in various portions of the sixth junction strip 912 and also in portions of the buses 960, 970 that are close to the sixth junction strip 912.

The seventh junction strip 914 provides a region where the current turns, as indicated by arrow 915, from fifth bus 970 as it travels down an elongated portion of the seventh bus towards second electrical contact 984. The third patterned region 976 of the fifth bus 970 which adjoins the seventh junction strip 914, has a higher sheet resistivity than the first patterned region 972 of the fifth bus. This helps reduce the formation of hot spots and cold spots in portions of the seventh junction strip 912 and also in portions of the fifth bus 970 that are close to the seventh junction strip 914.

The second electrical connector 984 is in communication with the seventh junction strip 914 and provides a second terminal for connecting to a power supply. The seventh junction strip 914 is provided with the elongated portion so that the second electrical contacts 984 is in close physical proximity to the first electrical contact 980. Thus, the first and second electrical contacts 980, 984 are sufficiently close to one another that they are connectable to corresponding contacts of a power cable having two or more wires.

As seen in the assembly of FIG. 9, in a patterned foil heating element, changes in sheet resistivity though varying hole attributes in regions where the current turns, may be used to reduce the likelihood of hot spots and cold spots. This may facilitate attaining temperature uniformity specification of such foil heating elements, and assemblies incorporating the same.

People skilled in the art know how to make and use electric heaters for aircraft de-icing and other applications, as exemplified by U.S. Pat. Nos. 5,475,204, 5,590,854, 6,027,075, 6,237,874 and 6,832,742, all of whose contents are incorporated by reference to the extent necessary to understand the present invention.

The above description of various embodiments of the invention is intended to describe and illustrate various aspects of the invention, and is not intended to limit the invention thereto. Persons of ordinary skill in the art will understand that certain modifications may be made to the described embodiments without departing from the invention. All such modifications are intended to be within the scope of the appended claims.

What is claimed is:

1. A foil heating element comprising:
a patterned foil sheet having:
a first discrete region patterned with a first plurality of holes forming multiple conductive ribbons and having a first sheet resistivity; and
a second discrete region patterned with a second plurality of holes forming multiple conductive ribbons and having a second sheet resistivity, wherein:
at least some of the multiple conductive ribbons in the first discrete region are in electrical continuity with at least some of the multiple conductive ribbons in the second discrete region; and
the first discrete region and the second discrete region both adjoin a first junction strip of the foil heating element.

2. The foil heating element according to claim 1, wherein:
the holes within the first discrete region are all a first size
the holes within the second discrete region are all a second size; and
the first and second sizes differ from one another.

3. The foil heating element according to claim 2, wherein:
the holes in the first discrete region have a first center spacing;
the holes in the second discrete region have a second center spacing; and
the first center spacing and the second center spacing are the same.

4. The foil heating element according to claim 2, wherein:
the holes in the first discrete region have a first shape;
the holes in the second discrete region have a second shape; and
the first shape and the second shape are the same.

5. The foil heating element according to claim 4, wherein:
the holes in the first discrete region have a first center spacing;
the holes in the second discrete region have a second center spacing; and
the first center spacing and the second center spacing are the same.

6. The foil heating element according to claim 1, wherein:
the holes in the first discrete region have a first average center spacing;
the holes in the second discrete region have a second average center spacing; and
the first average center spacing and the second average center spacing differ from one another.

7. The foil heating element according to claim 1, wherein:
the holes in the first discrete region have a first shape;
the holes in the second discrete region have a second shape; and
the first shape and the second shape differ from one another.

8. The foil heating element according to claim 1, wherein:
the first discrete region has a first ribbon-to-gap ratio;
the second discrete region has a second ribbon-to-gap ratio; and
the first ribbon-to-gap ratio differs from the second ribbon-to-gap ratio.

9. The foil heating element according to claim 8, wherein:
the holes within the first discrete region are all a first size
the holes within the second discrete region are all a second size; and
the first and second sizes differ from one another.

10. The foil heating element according to claim 9, wherein:
the holes in the first discrete region have a first center spacing;
the holes in the second discrete region have a second center spacing; and
the first center spacing and the second center spacing are the same.

11. The foil heating element according to claim 9, wherein:
the holes in the first discrete region have a first shape;
the holes in the second discrete region have a second shape; and
the first shape and the second shape are the same.

12. The foil heating element according to claim 11, wherein:
the holes in the first discrete region have a first center spacing;
the holes in the second discrete region have a second center spacing; and
the first center spacing and the second center spacing are the same.

13. The foil heating element according to claim 1, wherein:
the holes within the first discrete region form multiple electrical paths having a first average ribbon width;
the holes within the second discrete region form multiple electrical paths having a second average ribbon width; and
the first average ribbon width and the second average ribbon width differ from one another.

14. The foil heating element according to claim 1, further comprising:
a third discrete region patterned with a third plurality of holes forming multiple conductive ribbons and having a third sheet resistivity, the third discrete region also adjoining said first junction strip of the foil heating element.

15. An electrothermal heating assembly comprising:
a first foil heating element sandwiched between first and second layers of material, the first foil heating element comprising:
a patterned foil sheet having:
a first discrete region patterned with a first plurality of holes forming multiple conductive ribbons and having a first sheet resistivity; and
a second discrete region patterned with a second plurality of holes forming multiple conductive ribbons and having a second sheet resistivity, wherein:
at least some of the multiple conductive ribbons in the first discrete region are in electrical continuity with at least some of the multiple conductive ribbons in the second discrete region; and
the first discrete region and the second discrete region both adjoin a first junction strip of the foil heating element.

16. The electrothermal heating assembly according to claim 15, further comprising:
a second foil heating element electrically connected to said first foil heating element, and also sandwiched between said first and second layers of material.

17. The electrothermal heating assembly according to claim 16, wherein the first and second foil heating elements are in the same plane.

18. The electrothermal heating assembly according to claim 16, wherein the first and second foil heating elements are connected by a thermal fuse.

19. The electrothermal heating assembly according to claim 16, wherein:
the first foil heating elements is provided with a first electrical contact;
the second foil heating elements is provided with a second electrical contact; and
the first and second electrical contacts are sufficiently close to one another that they are connectable to corresponding contacts of a power cable.

20. The electrothermal heating assembly according to claim 16, wherein the first and second layers of material are thermally conductive and electrically insulative.

* * * * *